United States Patent [19]

Uemura et al.

[11] Patent Number: 5,045,356

[45] Date of Patent: Sep. 3, 1991

[54] PROCESS FOR PRODUCING CARBON/CARBON COMPOSITE HAVING OXIDATION RESISTANCE

[75] Inventors: Seiichi Uemura, Tokyo; Yoshio Sohda; Yasuji Ido, both of Kanagawa; Toshio Hirai, 3-4-91 Takamori, Sendai-shi, Miyagi-ken; Makoto Sasaki, 3-1-3 Minami-Koizumi, Sendai-shi, Miyagi-ken; Masayuki Niino, Miyagi, all of Japan

[73] Assignees: Nippon Oil Company, Limited, Tokyo; Toshio Hirai; Makoto Sasaki, both of Miyagi; Japan as represented by the Director-General National, Aerospace Laboratory, Tokyo, all of Japan

[21] Appl. No.: 329,977

[22] Filed: Mar. 29, 1989

[30] Foreign Application Priority Data

Mar. 31, 1988 [JP] Japan ................................ 63-76006

[51] Int. Cl.$^5$ .............................................. C23C 16/30
[52] U.S. Cl. .................................. 427/249; 427/255.2; 427/255.7; 427/248.1; 427/113

[58] Field of Search .................. 427/249, 248.1, 255.2, 427/255.7, 113; 428/367, 368, 408

[56] References Cited

U.S. PATENT DOCUMENTS

| | | | |
|---|---|---|---|
| 4,476,164 | 10/1984 | Veltri et al. | 427/249 |
| 4,580,524 | 4/1986 | Lackey, Jr. et al. | 118/725 |
| 4,582,751 | 4/1986 | Vasilos et al. | 428/307.3 |
| 4,668,579 | 5/1987 | Strangman et al. | 428/367 |

*Primary Examiner*—Shrive Beck
*Assistant Examiner*—Roy V. King
*Attorney, Agent, or Firm*—Scully, Scott, Murphy & Presser

[57] ABSTRACT

A carbon/carbon composite having oxidation resistance is produced by filling the voids of a carbon/carbon composite comprising 10–70% by volume of carbon fibers and 5–90% by volume of a carbonaceous matrix and having a void percentage of 10–55%, with at least one of carbon and a ceramic by chemical vapor infiltration and then coating the deposit surface with a ceramic or both ceramic and carbon by chemical vapor deposition.

4 Claims, No Drawings

PROCESS FOR PRODUCING CARBON/CARBON COMPOSITE HAVING OXIDATION RESISTANCE

BACKGROUND OF THE INVENTION

The present invention relates to a process for producing a carbon/carbon composite having oxidation resistance.

Carbon/carbon composites have unique properties; for example, in an inert gas atmosphere, even at high temperatures above 1,000° C., they maintain high strength and high modulus and exhibit small coefficients of thermal expansion. Their utilization is expected as materials for aerospace, brakes and furnaces. However, they are low in their resistance to oxidation, undergoing oxidative wastage at temperatures of 500° C. or so and higher. To prevent this, according to the prior art, a ceramic coating is formed on the surface of a carbon/carbon composite. However, there occurs delamination at the interface or crack formation due to the mismatch in thermal expansion coefficient between carbon and a ceramic material, so the function as the composite cannot be fulfilled to a satisfactory extent.

SUMMARY OF THE INVENTION

It is the object of the present invention to overcome the above-mentioned drawback of the prior art, particularly provide a process for producing a carbon/carbon composite superior in oxidation resistance and having a coating causing neither delamination nor crack formation. The present invention resides in a process for producing a carbon/carbon composite having oxidation resistance, which process comprises filling voids of a carbon/carbon composite with carbon and/or a ceramic material by chemical vapor deposition, the carbon/carbon composite comprising 10-70 vol % of carbon fibers and 5-90 vol. % of a carbonaceous matrix and having a open porosity of 10 to 55 vol. %, and then coating the deposit surface with a ceramic material or both a ceramic material and carbon by chemical vapor deposition.

DETAILED DESCRIPTION OF THE INVENTION

The carbon/carbon composite producing method according to the present invention will be described in detail hereinunder.

The carbon/carbon composite having a void percentage of 10 to 55% indicates a carbon/carbon composite comprising 10-70 vol. %, preferably 20-60 vol. %, more preferably 30-55 vol. %, of carbon fibers and 5-90 vol. %, preferably 10-60 vol. %, more preferably 15-55 vol. %, of a carbonaceous matrix and having a proportion of voids communication with the composite surface of 10-55%, preferably 20-50%, more preferably 25-45%.

Examples of the carbon fibers referred to herein include unidirectional laminates, two-dimensional fabrics or laminates thereof, three-dimensional fabrics, mat-like products and felt-like products, thus including two- or three-dimensional shaped products, using tow of 500 to 25,000 carbon filaments. Particularly, three-dimensional fabrics are preferred. As the carbon fibers there may be used pitch-, polyacrylonitrile- or rayon-based carbon fibers, but pitch-based carbon fibers are particularly preferred because of high oxidation resistance. The carbonaceous matrix referred to herein is obtained by the carbonization of a carbonaceous pitch, a phenolic resin or a furan resin. A carbonaceous matrix obtained by the carbonization of a carbonaceous pitch is particularly preferred. As the carbonaceous pitch there is used a coal or petroleum pitch having a softening point of 100° to 400° C., preferably 150° to 350° C. Both optically isotropic and anisotropic carbonaceous pitches are employable, but an optically anisotropic pitch having an optically anisotropic phase content of 60 to 100% is particularly preferred.

The carbon/carbon composite having a void percentage of 10-55% is obtained by impregnating a carbon precursor such as a carbonaceous pitch, a phenolic or a furan resin into a fabric or shaped product of the carbon fibers, followed by carbonization at atmospheric pressure, or under high pressure, or under uniaxial pressing.

The impregnation is attained by heat-melting a carbonaceous pitch for example, in a vacuum and contacting the molten pitch with a carbon fiber product, provided there may be used a solvent for cut-back to reduce the viscosity in the impregnation. Employable solvents include aromatic hydrocarbons, pyridine and quinoline.

The carbonization at atmospheric pressure can be carried out 400°-2,000° C. in an inert gas atmosphere. The carbonization under the pressure can be performed at 400°-2,000° C. under pressurizing to 50-10,000 kg/cm$^2$ using an inert gas. The carbonization under pressing can be conducted at 400°-2,000° C. under hot pressing to 10-500 kg/cm$^2$.

In order to improve the carbonization yield, the impregnated fibers may be rendered infusible prior to carbonization. This infusiblizing treatment is performed at 50°-400° C., preferably 100°-350° C., in an oxidative gas atmosphere. In this case, employable oxidative gases include air, oxygen, nitrogen oxides, sulfur oxides, halogens, and mixtures thereof. The infusiblizing treatment may be applied up to the center of the impregnated woven structure, or it may be done only to an extent of permitting the shape of the impregnated carbn fibers to be retained in the subsequent carbonization treatment.

In order to obtain the carbon/carbon composite having a void percentage of 10-55%, the impregnation/carbonization cycle may be repreated in a required number of times for densifying. This densification may be stopped at a certain degree to obtain the composite. Also, a densifying to less than 10% in terms of a void percentage may be followed by a chemical treatment and/or a physical treatment to a void percentage of 10-55%. For example, the portion of the carbonaceous matrix can be removed by oxidation etching.

According to the present invention, the voids of the carbon/carbon composite having a void percentage of 10-55% are filled with carbon and/or a ceramic material obtained by chemical vapor infiltration, then the deposit surface is coated with a ceramic material or both a ceramic material and carbon by chemical vapor deposition. The operation of filling the voids with carbon and/or a ceramic material depositionwise by vapor phase decomposition is generally called CVI (chemical vapor infiltration), and the operation of coating the deposit surface with a ceramic material or both a ceramic material and carbon depositionwise by vapor phase decomposition is generally called CVD (chemical vapor deposition). Concrete examples are thermal CVI/CVD and plasma CVI/CVD.

Examples of the ceramic material used in depositing it and/or carbon by CVI or CVD include SiC, ZrC, TiC, HfC, B$_4$C, NbC, WC, TiB$_2$, BN, and Si$_3$N$_4$, with SiC, ZrC, TiC and HfC being particularly preferred. The ceramic material and carbon may be deposited simultaneously.

Employable decomposition gases for obtaining carbon are hydrocarbons, preferably hydrocarbons having 1 to 6 carbon atoms, as well known, including methane, natural gas, propane and benzene. Employable decomposition gases for obtaining a ceramic material include, as well known, halides, hydrides, organometallic compounds, and mixtures thereof with the above hydrocarbon gases, hydrogen or inert gases. More concretely, $SiCl_4$ and $CH_3SiCl_3$ may be used for SiC; $ZrCl_4$ for ZrC; $TiCl_4$ for TiC; and $HfCl_4$ for HfC.

Reaction conditions differ between CVI and CVD. In case of filling the voids of the carbon/carbon composite by CVI, the temperature is in the range of 1,000° to 1,500° C. and pressure 0.1 to 50 Torr, preferably 0.1 to 10 Torr. On the other hand, where the deposit surface is to be coated with a ceramic material or both carbon and a ceramic material by CVD, the temperature is in the range of 1,000° to 2,000° C. and pressure 5 to 760 Torr preferably 50 to 760 Torr.

Where the two reaction of CVI and CVD are to be conducted in a continuous manner, it is preferable that the reaction conditions be changed continuously. More particularly, it is preferable that the depositionwise filled portion by CVI and the depositionwise coated portion by CVD be different in at least one of texture, structure and composition and that at least one of texture, structure and composition be changed continuously.

For the difference in at least one of texture, structure and composition and for continuous change of at least one of texture, structure and composition, at least one of reaction temperature, reaction pressure, feed gas rate and feed gas ratio is changed continuously. A continuous change of CVI/CVD temperature is performed in the range of 1,000° to 1,500° C. in case of CVI and 1,000° to 2,000° C. in case of CVD, and the time required for the change is, say, 5 minutes to 10 hours. A continuous change of CVI/CVD pressure is performed in the range of 0.1 to 50 Torr in case of CVI and 5 to 760 Torr in case of CVD, requiring, say, 5 minutes to 10 hours. The feed gas rate greatly differs depending on the size, structure and geometry of the furnace used in each reaction, but in the use of a reactor having a capacity of 24,000 $cm^3$, the feed speed may be changed continuously in the range of between 10 to 10,000 $cm^3$/min (normal state), requiring, say, 5 minutes to 10 hours. The feed ratio may be changed continuously so that the proportion of one component of the resulting deposit is in the range of 0% to 100%. The time required for the change is, say, 5 minutes to 10 hours.

Further, it is desirable to change at least one of texture, structure and composition continuously so that the thus-filled and -coated composite has a minimum thermal stress distribution. Since the composite is often used under temperature gradient, there occurs a thermal stress in its interior. In addition to imparting oxidation resistance to the composite, it is also an important subject to impart a thermal stress mitigating characteristic thereto. Therefore, also as to CVI and/or CVD itself, it is desirable to change at least one of texture, structure and composition so as to give a minimum thermal stress and its distribution.

The "texture" as referred to herein indicates a fine texture of a micron order capable of being identified using, for example, an optical microscope or a scanning electron microscope. For changing the texture continuously, at least one of temperature, pressure, feed gas rate and feed gas ratio may be changed continuously. Particularly, it is preferred to change at least one of temperature, pressure and feed speed continuously.

The "structure" as referred to herein indicates a crystal level structure capable of being identified by, for example, X-ray diffraction, a high resolution electron microscope, or Raman spectrum. The structure can be continuously changed by continuously changing at least one of temperature, pressure, feed speed and feed ratio. Particularly, it is desirable to change at least one of temperature, pressure and feed speed continuously.

The "composition" as referred to herein indicates components capable of being identified chemically, e.g. components capable of being identified by elementary analysis or using an energy dispersion type fluorescent X-ray apparatus (ESCA), as well as voids. More specifically, it indicates carbon, ceramics as exemplified previously, and voids different in size or distribution. The composition can be continuously changed by continuously changing at least one of temperature, pressure, feed speed and feed ratio. Especially, it is preferred to change the feed ratio continuously.

The following examples are given to illustrate the present invention concretely.

EXAMPLE 1

An orthogonal three-dimensional fabric using 2,000 pitch-based carbon filaments each 10 μm in diameter was impregnated with an optically anisotropic pitch having a softening point of 280° C. The thus-impregnated fabric was hot-pressed at 700° C. under a pressure of 100 kg/$cm^2$ and then carbonized at 1,300° C. for 1 hour under atmospheric pressure to obtain a carbon/carbon composite. The composite was found to comprise 30 vol. % of carbon filaments and 40 vol. % of a carbonaceous matrix and have a void percentage of 30%.

The carbon/carbon composite was placed in a furnace and subjected to thermal CVI at 1,150° C., 5 Torr while passing $C_3H_8$ at a rate of 40 $cm^3$/min (normal state), to fill the voids with carbon depositionwise by vapor phase decomposition. Then, the surface was coated with SiC depositionwise by thermal CVD while conditions were changed continuously so that the pressure was 100 Torr and feed gases became a mixture of $SiCl_4$ (170 $cm^3$/min)+$C_3H_8$ (40 $cm^3$/min)+$H_2$ (700 $cm^3$/min) (the flow rates being all normal state). The time required for changing conditions was 30 minutes. The thus-filled and -coated composite was observed using a scan type electron microscope and an energy dispersion type fluorescent X-ray apparatus to find that carbon was uniformly deposited by CVI in the voids of the carbon/carbon composite and that the surface was coated with SiC by CVD. A continuous change was observed in the composition between the CVI and CVD deposits, and neither surface delamination nor crack was observed.

EXAMPLE 2

An orthogonal three-dimensional fabric using 2,000 pitch-based carbon filaments each 10 μm in diameter in Z axis direction and 4,000 of the same filaments in X and Y axes directions was impregnated with an optically anisotropic pitch having a softening point of 280° C. The thus-impregnated fabric was carbonized at 550° C. under a pressure of 200 kg/$cm^2$ and then further carbonized for 1 hour at 1,200° C. and at atmospheric pressure to obtain a carbon/carbon composite.

The carbon/carbon composite, which was found to comprise 50 vol. % of carbon filaments and 30 vol. % of a carbonaceous matrix and have a void percentage of 20%, was placed in a furnace and subjected to hot CVI at 1,150° C., 5 Torr while passing a gaseous mixture of $SiCl_4$ (50 cm$^3$/min)+$C_3H_8$ (40 cm$^3$/min)+$H_2$ (200 cm$^3$/min) to fill the voids with carbon and SiC depositionwise by vapor phase decomposition. Then, the surface was coated with SiC depositionwise by thermal CVD while conditions were changed continuously over a 30 minute period so that the pressure was 100 Torr and the feed gases became a mixture of $SiCl_4$ (170 cm$^3$/min)+$C_3H_8$ (40 cm$^3$/min)+$H_2$ (700 cm$^3$/min). The thus-filled and -coated composite was obserbed using a polarizing microscope and a scan type electron microscope to find that carbon and SiC were deposited uniformly by CVI in the voids of the carbon/carbon composite and that the surface was coated with SiC by CVD. A continuous change was observed in the composition between the CVI and CVD deposits, and no surface separation was observed.

EXAMPLE 3

The carbon/carbon composite obtained in Example 1 was placed in a furnace and subjected to thermal CVI at 1,050° C., 20 Torr while passing $CH_3SiCl_3$ to fill the voids with SiC. Then, conditions were changed continuously up to 1,300° C. and 100 Torr during the period of 1 hour and thereafter the surface was coated with SiC by thermal CVD. The thus-filled and -coated composite was observed using a polarized microscope, a scanning electron microscope and a Laser Raman spectrometry to find that SiC was deposited uniformly by CVI in the voids of the carbon/carbon composite and that the surface was coated with SiC by CVD. There was observed a continuous change in the texture between the CVI and CVD deposits, and no surface delamination was observed.

Comparative Example 1

A carbon/carbon composite comprising 30 vol. % of carbon filaments and 65 vol. % of a carbonaceous matrix and having a void percentage of 5% was placed in a furnace and the surface thereof was coated with SiC by thermal CVD at 1,300° C., 100 Torr while passing $CH_3SiCl_3$ as in Example 3. The thus-coated composite was inspected using a scanning electron microscope and was found to have delamination.

EXAMPLE 4

The carbon/carbon composite obtained in Example 2 was placed in a furnace and subjected to thermal CVI while the gas composition was changed continuously from $C_3H_8$ (40 cm$^3$/min) to a gaseous mixture of $SiCl_4$ (50 cm$^3$/min)+$C_3H_8$ (40 cm$^3$/min)+$H_2$ (200 cm$^3$/min), at 1,150° C., 5 Torr, to fill the voids with carbon, then carbon/SiC deposit by vapor phase decomposition. Then, the surface was coated with SiC by thermal CVD while conditions were changed continuously to a temperature of 1,500° C., a pressure of 300 Torr and a feed gas composition of $SiCl_4$ (170 cm$^3$/min)+$C_3H_8$ (40 cm$^3$/min)+$H_2$ (700 cm$^3$/min). The thus-filled and -coated composite was observed using a polarizing microscope and a scanning electron microscope to find that carbon, then carbon/SiC were uniformly deposited by CVI in the voids of the carbon/carbon composite and that the surface was coated with SiC deposit by CVD. A continuous change was observed in the texture between the CVI and CVD deposits, and no delamination was observed.

EXAMPLE 5

The carbon/carbon composite (carbon filaments 50 vol. %, carbonaceous matrix 30 vol. %, void percentage 20%) obtained in Example 2 was placed in a furnace and subjected to hot CVI at 1,150° C., 5 Torr while passing $C_3H_8$ at 40 cm$^3$/min (normal state) to fill the voids depositionwise by vapor phase decomposition. Subsequently, also at 1,150° C., 5 Torr, there was performed thermal CVI under continuous change in condition into a feed gas composition of $SiCl_4$ (170 cm$^3$/min)+$C_3H_8$ (40 cm$^3$/min)+$H_2$ (700 cm$^3$/min) over a 2 hour period. Lastly, conditions were changed continuously up to 1,500° C., 300 Torr over a 30 minute period and the surface was coated with SiC by thermal CVD. The thus-filled and -coated composite was observed using a polarized microscope and a scanning electron microscope to find that carbon, then carbon/SiC were deposited by CVI in the voids of the carbon/carbon deposit and that the surface was coated with SiC deposit by CVD. A continuous change was observed in the composition between the CVI and CVD deposits, and no delamination was observed.

EXAMPLE 6

An orthogonal three-dimensional fabric using 2,000 pitch-based carbon filaments each 10 μm in diameter was impregnated with an optically anisotropic pitch having a softening point of 280° C. The impregnated fabric was hot-pressed at 700° C. under a pressure of 100 kg/cm$^2$ and then carbonized at 1,300° C. for 1 hour to obtain a carbon/carbon composite comprising 30 vol. % of carbon filaments and 40 vol. % of a carbonaceous matrix and having a void percentage of 30%.

The carbon/carbon composite was placed in a furnace subjected to thermal CVI at 1,150° C., 5 Torr while passing $C_3H_8$ (40 cm$^3$/min) to fill the voids with carbon by vapor phase decomposition. Then, after a continuous change in condition to 100 Torr at 1,150° C., the feed gas composition was changed continuously from $SiCl_4$ (50 cm$^3$/min)+$C_3H_8$ (40 cm$^3$/min)+$H_2$ (200 cm$^3$/min) to $SiCl_4$ (170 cm$^3$/min)+$C_3H_8$ (40 cm$^3$/min)+$H_2$ (700 cm$^3$/min), and the surface of coated with a continuous texture from carbon/SiC to SiC by thermal CVD. The thus-filled and -coated composite was observed using a scanning electron microscope and an energy dispersion type fluorescent X-ray apparatus to find that carbon was uniformly deposited by CVI in the voids of the carbon/carbon composite and that the surface was coated with carbon/SiC deposit by CVD. A continuous change was observed in the composition between the CVI and CVD deposits, and no delamination was observed.

EXAMPLE 7

An orthogonal three-dimensional fabric using 2,000 pitch-based carbon filaments each 10 μm in diameter in Z direction and 4,000 of the same filaments in X and Y directions was impregnated with an optically anisotropic pitch having a softening point of 280° C. The impregnated fabric was carbonized at 550° C. under a pressure of 200 kg/cm$^2$ and further carbonized at 1,200° C. for 1 hour under atmospheric pressure to obtain a carbon/carbon composite.

The carbon/carbon composite, which was found to comprise 50 vol. % of carbon filaments and 30 vol. % of a carbonaceous matrix and have a void percentage of 20%, was placed in a furnace and subjected to thermal CVI at 1,150° C., 5 Torr while passing a gaseous mixture of $SiCl_4$ (50 cm$^3$/min)+$C_3H_8$ (40 cm$^3$/min)+$H_2$ (200 cm$^3$/min) to fill the voids with carbon and SiC depositionwise by vapor phase decomposition. Then, while the temperature and pressure conditions were changed continuously up to 1,500° C. and 300 Torr, respectively, the feed gas composition was also changed continuously from $SiCl_4$ (50 cm$^3$/min)+$C_3H_8$ (40 cm$^3$/min)+$H_2$ (200 cm$^3$/min) to $SiCl_4$ (170 cm$^3$/min)+$C_3H_8$ (40 cm$^3$/min)+$H_2$ (700 cm$^3$/min), and the surface was coated under continuous change in composition from carbon/SiC to SiC depositionwise by thermal CVD. The thus-filled and -coated composite was inspected using a polarized microscope and a scanning electron microscope to find that the voids of the carbon/carbon composite were filled with carbon/SiC uniformly by CVI and that the surface was coated with carbon/SiC deposit by CVD. A continuous change was observed in the composition between the CVI and CVD deposits, and no surface separation was observed.

EXAMPLE 8

The carbon/carbon composite obtained in Example 2 was placed in a furnace and thermal CVI of $C_3H_8$ (40 cm$^3$/min) was started at 1,150° C., 5 Torr, then hot CVI was performed also at 1,150° C., 5 Torr, under continuous change to a gas composition of $SiCl_4$ (50 cm$^3$/min)+$C_3H_8$ (40 cm$^3$/min)+$H_2$ (200 cm$^3$/min) over a 30 minute period to fill the voids with a continuous texture from carbon to carbon/SiC depositionwise by vapor phase decomposition. Then, while the temperature and pressure conditions were changed continuously up to 1,500° C. and 300 Torr, respectively, the feed gas composition was also changed continuously from $SiCl_4$ (50 cm$^3$/min)+$C_3H_8$ (40 cm$^3$/min)+$H_2$ (200 cm$^3$/min) to $SiCl_4$ (170 cm$^3$/min)+$C_3H_8$ (40 cm$^3$/min)+$H_2$ (700 cm$^3$/min) and the surface was coated under continuous change in composition from carbon/SiC to SiC by CVD. The thus-filled and -coated carbon/carbon composite was observed using a polarized microscope and a scanning electron microscope to find that the voids of the composite were uniformly filled with carbon/SiC deposit by CVI and that the surface was coated with carbon/SiC deposit by CVD. A continuous change was observed in the texture and composition between the CVI and CVD deposits, and no delamination was observed.

What is claimed is:

1. A process for producing a carbon/carbon composite having oxidation resistance which comprises treating the surface of a carbon/carbon composite by filling the voids of a carbon/carbon composite comprising 10–70% by volume of carbon fibers and 5–90% by volume of a carbonaceous matrix having a void percentage of 10–55% with carbon and/or a ceramic selected from the group consisting of SiC, ZrC, TiC, HfC, $B_4C$, NbC, WC, $TiB_2$, BN and $Si_3N_4$ by chemical vapor infiltration (CVI), said CVI performed at a temperature of from 1000° to 1500° C. and a pressure from 0.1 to 50 Torr, and then coating the treated surface with a ceramic or both a ceramic and carbon, said ceramic selected from the group consisting of SiC, ZrC, TiC, HfC, $B_4C$, NbC, WC, $TiB_2$, BN and $Si_3N_4$ by chemical vapor deposition (CVD), said CVD performed at a temperature of from 1000° to 2000° C. and a pressure of from 50 to 760 Torr, wherein at least one of temperature, pressure, feed gas rate and feed gas ratio employed in each of said CVI and CVD procedures is changed continuously to provide a continuous change of at least one of texture, structure and composition of said carbon and/or ceramic which effectively increases the carbon's and/or the ceramic's resistance to cracking and delamination.

2. A process as set forth in claim 1, wherein said carbon/carbon composite having a void percentage of 10–55% has been obtained by impregnating a carbon fiber fabric with a carbonaceous pitch and then carbonizing said carbonaceous pitch.

3. A process as set forth in claim 1, wherein a hydrocarbon having 1 to 6 carbon atoms is used as a decomposition gas for obtaining carbon.

4. A process as set forth in claim 1, wherein as a decomposition gas for obtaining the ceramic material there is used a halide or hydride of Si, Zr, Ti, Hf, B, Nb, W, or a combination thereof with a hydrocarbon gas.

* * * * *